(12) United States Patent
Bleier et al.

(10) Patent No.: US 7,168,817 B2
(45) Date of Patent: Jan. 30, 2007

(54) ROOF MIRROR ASSEMBLY

(75) Inventors: Zvi Bleier, Lloyd Harbor, NY (US); Itai Vishnia, Setauket, NY (US)

(73) Assignee: PLX, Inc., Deer Park, NY (US)

( * ) Notice: Subject to any disclaimer, the term of this patent is extended or adjusted under 35 U.S.C. 154(b) by 0 days.

(21) Appl. No.: 10/826,688

(22) Filed: Apr. 16, 2004

(65) Prior Publication Data

US 2004/0223241 A1    Nov. 11, 2004

Related U.S. Application Data

(63) Continuation-in-part of application No. 09/894,207, filed on Jun. 28, 2001, now Pat. No. 6,729,735.

(51) Int. Cl.
*G02B 5/08* (2006.01)
*G02B 7/182* (2006.01)

(52) U.S. Cl. .................. 359/855; 359/856; 359/857

(58) Field of Classification Search ............... 359/834, 359/836, 850, 855, 856, 857, 871
See application file for complete search history.

(56) References Cited

U.S. PATENT DOCUMENTS

| | | | |
|---|---|---|---|
| 116,589 A * | 7/1871 | Hartmann | |
| 328,606 A * | 10/1885 | Park | 359/855 |
| 505,127 A * | 9/1893 | Ranger | 359/855 |
| 621,283 A | 3/1899 | Pulfrich | |
| 784,487 A | 3/1905 | Goerz et al. | |
| 1,334,810 A * | 3/1920 | Smith, Jr. | 359/855 |
| 1,635,011 A | 7/1927 | Sadler | |
| 2,167,657 A | 8/1939 | Kames | |
| 3,252,377 A * | 5/1966 | Kentes | 359/855 |
| 3,966,298 A | 6/1976 | Chapman | |
| 3,977,765 A | 8/1976 | Lipkins | |
| 4,065,204 A | 12/1977 | Lipkins | |
| 4,401,384 A * | 8/1983 | Abe | 399/118 |
| 4,704,000 A | 11/1987 | Pekar et al. | |

(Continued)

*Primary Examiner*—Ricky D. Shafer
(74) *Attorney, Agent, or Firm*—Kaplan Gilman Gibson & Dernier LLP

(57) ABSTRACT

An improved roof mirror assembly is provided. The roof mirror assembly of the invention is comprised of first and second mirror panels comprising first and second reflective surfaces and first and second mounting surfaces, respectively, the first and second mirror panels being joined together so that the first and second reflective surfaces are substantially perpendicular to each other. The assembly further comprising at least one mounting block comprising at least one opening extending through a portion thereof and at least one mounting pin received within the at least one opening of the at least one mounting block, wherein the at least one mounting pin is attached within the opening to the at least one mounting block and is attached to at least one of the first or second mounting surfaces of the first or second mirror panels. In an embodiment not having the mounting pins, the mirror panels each comprise first and second ends, wherein the first ends of the mirror panels are proximate to each other and the second ends of the mirror panels are proximate to each other when the mirror panels are in their joined condition, and the at least one mounting block is attached to the first ends of the mirror panels, and the assembly is mounted onto another structure along a bottom surface of the at least one mounting block.

33 Claims, 17 Drawing Sheets

U.S. PATENT DOCUMENTS

| | | | |
|---|---|---|---|
| 5,015,071 A * | 5/1991 | Richter et al. | 359/850 |
| 5,024,514 A | 6/1991 | Bleier et al. | |
| 5,122,901 A | 6/1992 | Bleier | |
| 5,134,519 A | 7/1992 | Abele et al. | |
| 5,301,067 A | 4/1994 | Bleier et al. | |
| 5,335,111 A | 8/1994 | Bleier | |
| 5,361,171 A | 11/1994 | Bleier | |
| 5,589,991 A * | 12/1996 | Bleier | 359/856 |
| 5,625,501 A * | 4/1997 | Taggert | 359/855 |
| 5,949,543 A * | 9/1999 | Bleier et al. | |
| 6,290,363 B1 * | 9/2001 | Masutani | 359/856 |
| 6,322,222 B1 * | 11/2001 | Kobayashi | 359/855 |
| 6,729,735 B2 * | 5/2004 | Bleier | 359/856 |
| 6,752,503 B2 * | 6/2004 | Bleier | 359/871 |
| 6,786,608 B1 * | 9/2004 | Bleier | 359/515 |
| 6,827,455 B2 * | 12/2004 | Bleier | 359/879 |
| 6,945,661 B2 * | 9/2005 | Bleier | 359/856 |

\* cited by examiner

ROOF MIRROR ASSEMBLY

This application is a continuation-in-part of application Ser. No. 09/894,207, filed Jun. 28, 2001, issued May 4, 2004 as U.S. Pat. No. 6,729,735, which application is hereby incorporated by reference herein in its entirety.

BACKGROUND OF THE INVENTION

This invention relates to the field of retroreflectors, and more particularly, to lateral transfer retroreflectors and roof mirror assemblies.

Retroreflectors generally have the property of causing incident and reflected light rays to travel along parallel paths. To achieve this parallelism, a retroreflector normally consists of three optically flat reflecting surfaces, each reflecting surface positioned at a right angle to each of the other reflecting surfaces. Any departure of the reflecting surfaces from their perpendicular orientation will cause the incident and reflected light rays to depart from parallel.

Retroreflectors lose accuracy when they are exposed to external stresses. Examples of such external stresses are mass, thermal expansion or contraction of the substrate material from which the retroreflector is made, or deflection caused by curing of the adhesives which join members of the retroreflector.

A roof mirror assembly is an optical assembly consisting of two mirror panels having their reflective surfaces arranged at substantially right angles to each other. Often, a roof mirror is used in association with another single mirror panel offset from the roof mirror assembly. In such a configuration, the reflective surface of the single mirror panel is arranged to be at a substantially right angle to each of the reflective surfaces of the roof mirror assembly. Such an overall optical device is normally called a lateral transfer retroreflector because the three substantially perpendicular reflective surfaces of the three mirror panels (two from the roof mirror and the one, single panel) are essentially arranged in the formation of a retroreflector assembly, but with one of the mirror panels (the single panel) of the retroreflector assembly offset a lateral distance from the other two mirror panels (the roof mirror).

Accordingly, there has been significant development of retroreflectors/roof mirrors/lateral transfer retroreflectors that focus on the precision of the alignment of the reflective panels of these assemblies, so as to achieve the greatest degree of parallelism possible of the incident and reflected rays. When striving to construct a very accurate retroreflector/roof mirror/lateral transfer retroreflector assembly, attention will be given to reducing the external stresses that cause deflection of the reflective surfaces of the individual mirror panels upon joining the mirror panels together. Examples of such external stresses are mass, thermal expansion or contraction of the substrate material from which the mirror panels are made, or deflection caused by curing of the adhesives which join the mirror panels together or adhere the mirror panels to their supporting members.

Examples of some of these prior art retroreflectors, roof mirror assemblies and lateral transfer retroreflectors, are:

U.S. Pat. No. 3,977,765 to Morton S. Lipkins, which disclosed a retroreflector mounted to a support structure through means of applying a small amount of adhesive into the joints formed between joined members of the retroreflector and to a flat surface of the support structure.

U.S. Pat. No. 4,065,204, also to Morton S. Lipkins, which disclosed a lateral transfer retroreflector consisting of a base, a roof reflector having two reflecting plates and a third reflector. The base acts as an extension of the third reflector by attaching the third reflector to the roof reflector in the manner known to retroreflectors to produce the lateral transfer retroreflector construction.

U.S. Pat. No. 5,024,514 to Zvi Bleier and Morton S. Lipkins, which disclosed a lateral transfer retroreflector having a roof mirror of a particular construction and attached to the underlying lateral transfer member through use of three co-planar mounting pads.

U.S. Pat. No. 5,361,171 to Zvi Bleier, disclosed a lateral transfer retroreflector having a particular and different roof mirror construction than that shown in the '514 patent.

It would be desirable to provide a high-accuracy lateral transfer retroreflector that is off-the-shelf adjustable as to the displaced length between the mirror panel and the roof mirror and also having a less temperature-deviant assembly and mounting of the roof mirror and mirror panel.

It would be further desirable to provide still further constructions for a high-accuracy roof mirror assembly to be used in lateral transfer retroreflector assemblies and other optical assemblies, whereby the roof mirror assembly is a separately constructed and assembled unit that maintains the reflective surfaces of its two mirror panels in as near perpendicular orientation as possible, while allowing assembly of this roof mirror assembly to such other structure without substantially affecting the alignment of the reflective panels of the roof mirror assembly.

SUMMARY OF THE INVENTION

In accordance with the invention, an improved roof mirror assembly is provided. The roof mirror assembly of the invention is comprised of first and second mirror panels comprising first and second reflective surfaces and first and second mounting surfaces, respectively, the first and second mirror panels being joined together so that the first and second reflective surfaces are substantially perpendicular to each other. The assembly further comprising at least one mounting block comprising at least one opening extending through a portion thereof and at least one mounting pin received within the at least one opening of the at least one mounting block, wherein the at least one mounting pin is attached, preferably using adhesive material, within the opening to the at least one mounting block and is attached to at least one of the first or second mounting surfaces of the first or second mirror panels. In one embodiment, the first and second mirror panels and the at least one mounting block may be formed of the same material. In one embodiment, the material has dimensional stability with respect to changes in temperature. In one embodiment, the material is one of fused quartz or annealed pyrex. In an embodiment not having the mounting pins, the mirror panels each comprise first and second ends, wherein the first ends of the mirror panels are proximate to each other and the second ends of the mirror panels are proximate to each other when the mirror panels are in their joined condition, and the at least one mounting block is attached to the first ends of the mirror panels, and the assembly is mounted onto another structure along a bottom surface of the at least one mounting block.

In addition, the roof mirror assembly and the mirror panel mounting are, in a preferred embodiment, kinematic structures that are also improvements over earlier constructions. In particular, the roof mirror assembly of the subject invention has, in a preferred, but not required, embodiment, at least a pair of mounting blocks that act also as back supports and are located substantially at opposite ends of the roof mirror. However, the invention also anticipates the roof mirror assembly having only at least one mounting member. The manner of attachment of the mounting blocks to the back portions of the mirror panels making up the roof mirror assembly, is such that expansion and contraction of the reflective surfaces of the mirror panels of the roof mirror assembly will be in a direction substantially perpendicular to the direction of the roof angle axis. Deflection in this direction helps to minimize displacement (error) of the transmitted light beam traveling through the lateral transfer retroreflector. Similarly, the mounting of the mirror panel to the mirror panel housing by means of substantially 45° chamfered edges, insures that the forces exerted by thermal expansion or contraction of the bonding material situated along those chamfered edges, will have a canceling effect, and not deflect the reflective surface of the mirror panel.

Accordingly, it is an object of the present invention to provide an improved lateral transfer retroreflector assembly and an improved roof mirror assembly.

Still another object of the invention is to provide a lateral transfer retroreflector assembly having a component construction capable of allowing for off-the-shelf customization for different customer needs based upon differing customer specifications.

Yet a further object of the invention is to provide a lateral transfer retroreflector assembly having a roof mirror assembly construction and mounting such that deformations in the reflective surfaces of the mirror panels of the roof mirror assembly due to thermal expansion/contraction are minimized in the direction of the roof angle axis.

A still further object of the invention is to provide a lateral transfer retroreflector assembly, wherein the deflective forces exerted on the mirror panel by thermal expansion or contraction of the joint bonding the mirror panel to the mirror panel housing, are minimized.

Other objects of the invention will in part be obvious and will in part be apparent from the following description taken in association with the figures.

The invention accordingly comprises an assembly possessing the features, properties and relation of components which will be exemplified in the products hereinafter described, and the scope of the invention will be indicated in the claims.

BRIEF DESCRIPTION OF THE DRAWINGS

For a fuller understanding of the invention, reference is made to the following description taken in connection with the accompanying drawings, in which:

FIG. 17 is a bottom perspective view of the assembled roof mirror of FIG. 16.

DETAILED DESCRIPTION OF THE PREFERRED EMBODIMENTS

Figure 1:
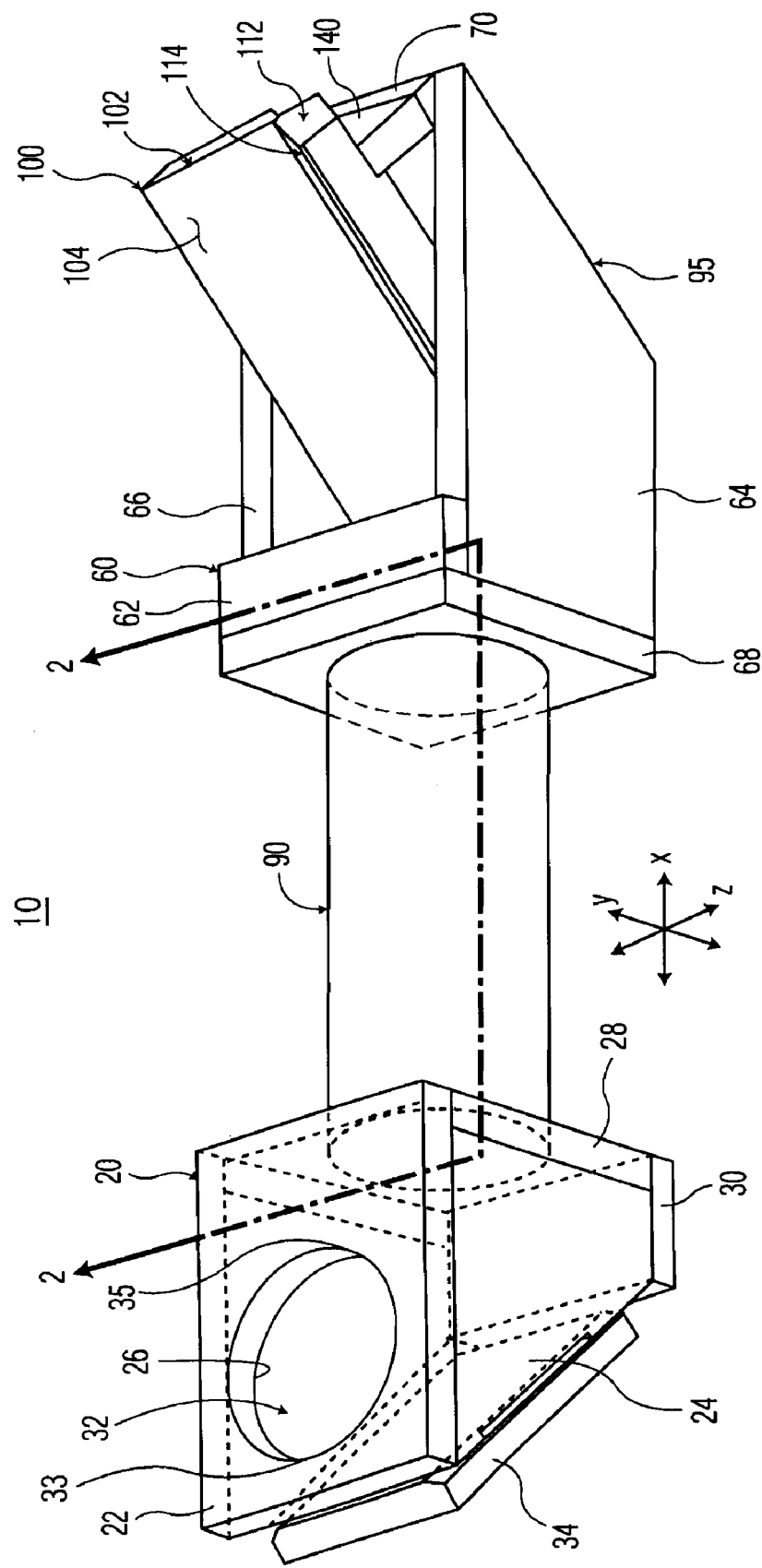
FIG. 1 is a perspective view of a lateral transfer retroreflector assembly made in accordance with the invention.

Referring to FIG. 1, a lateral transfer retroreflector assembly made in accordance with the invention and generally designated at 10, is illustrated. Lateral Transfer Retroreflector ("LTR") 10 comprises three components; a mirror panel housing 20, a roof mirror assembly housing 60 and a connecting member 90, having a thickness 92.

Figure 4:
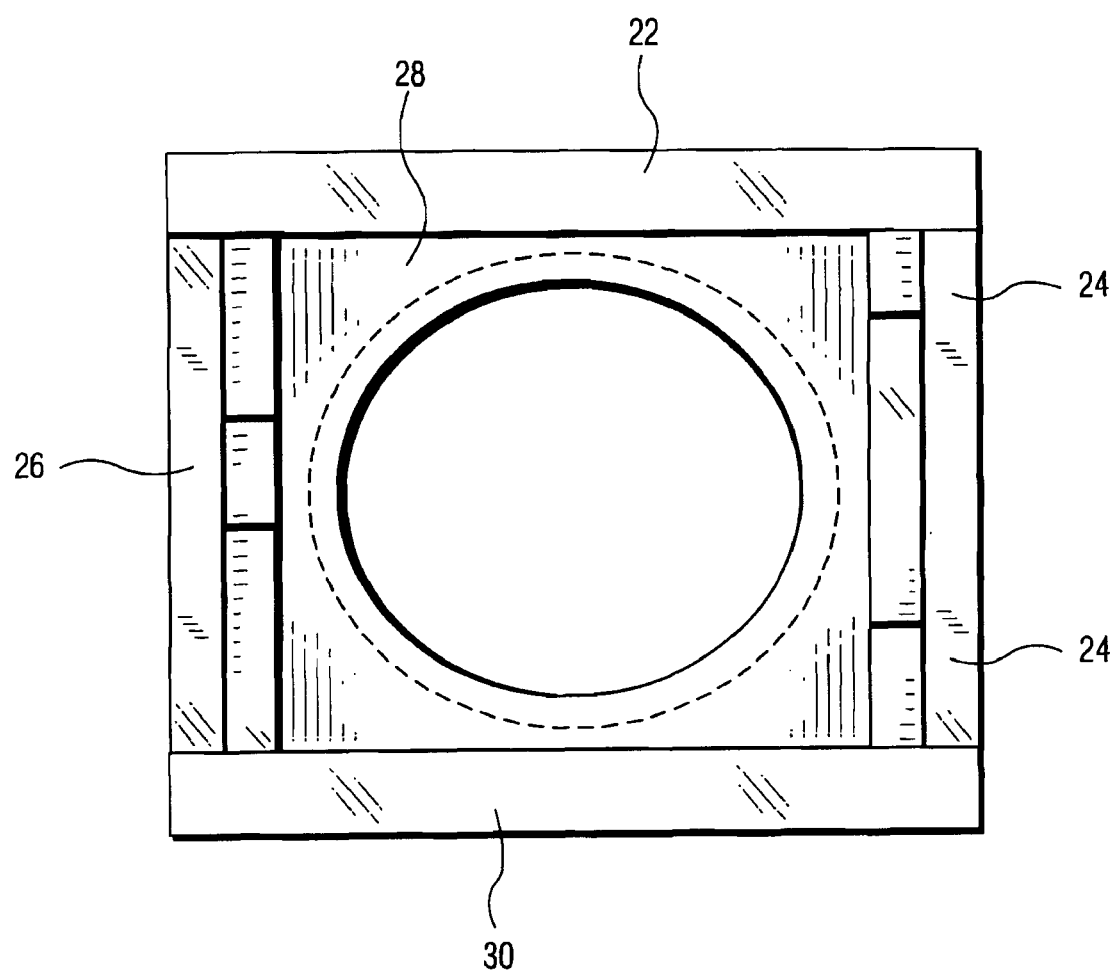
FIG. 4 is a left side elevational view of the mirror panel housing of the invention.

As seen in FIGS. 1 and 4, mirror panel housing 20 is comprised of first and second side members 24 and 26, as well as receiving member 28, for receiving connecting member 90. Housing 20 can also include member 30, to lend extra stability to the structure, as well as aperture receiving member 22, having aperture 32 extending therethrough. Aperture 32 can be of any geometric configuration, the preferred configurations being in the circle and square families. Aperture 32 has a first end 33 and a second end 35, the distance between which will help dictate the inside diameter of connecting member 90. It is to be understood herein that member 90 does not have to be circular in cross section, but could be of other shapes; particularly square. However, since light beams to be passed through LTR 10 are normally themselves circular in cross section, the preferred embodiment shown in the figures and discussed herein, will regard a circular aperture 32 and a circular tubular member 90.

Continuing with the above discussion, the dimensional congruity between the size of aperture 32 and the cross sectional diameter of member 90 will insure that a light beam passing through LTR 10 will propagate through member 90 very close to the inside surface of member 90 as the beam approaches either of ends 33 or 35 of aperture 32.

Figure 2:
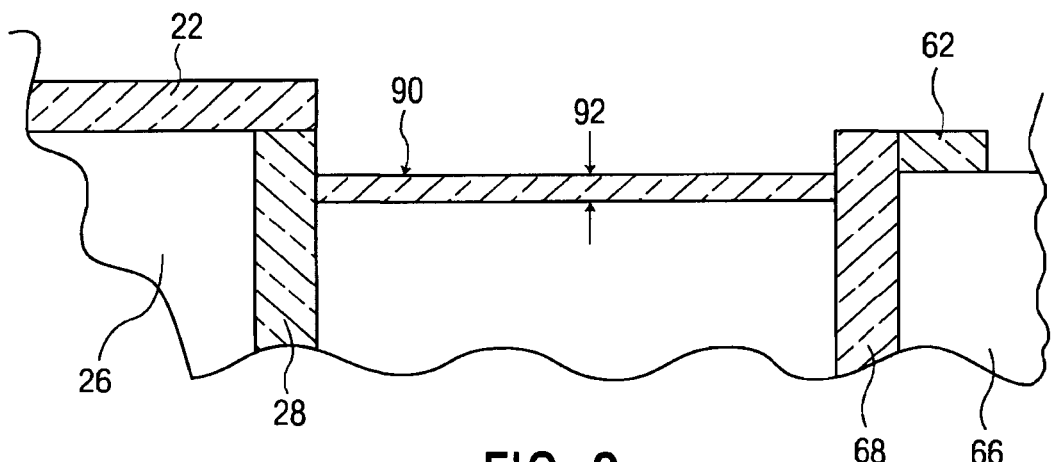
FIG. 2 is a cross-sectional view taken along line 2—2 of FIG. 1.

It is also seen in FIGS. 1 and 2 that roof mirror assembly housing 60 is comprised of side members 64 and 66, receiving member 68, as well as a top member 62. Receiving members 28 of mirror panel housing 20 and 68 of roof mirror assembly housing 60, receive connecting member 90 to join housings 20 and 60 into a complete lateral transfer retroreflector assembly 10.

Figure 3:
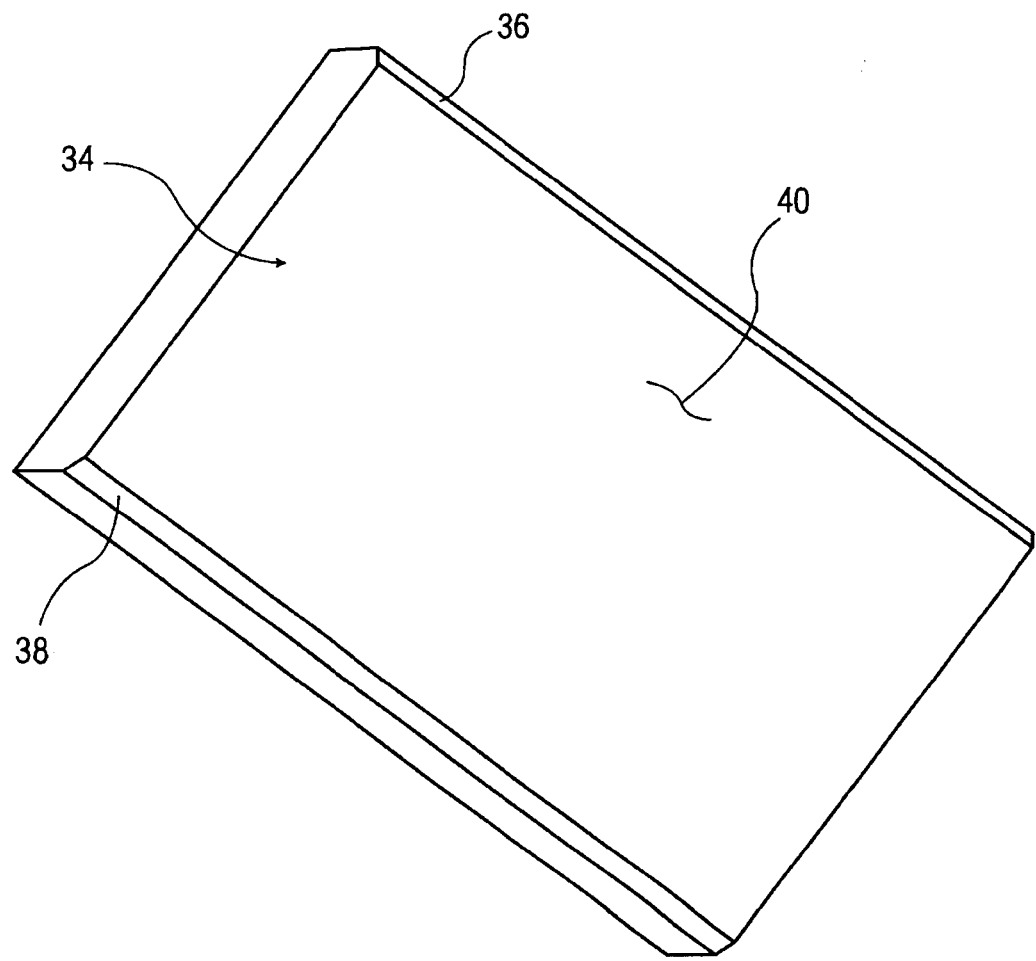
FIG. 3 is a perspective view of the mirror panel of the invention.

Turning now to FIG. 3, mirror panel 34 to be used with LTR 10 is shown. Mirror panel 34 has a reflective surface 40, and two chamfered edges 36 and 38. As seen in FIG. 1, mirror panel 34 is adhered to mirror panel housing 20 in such a manner as to be oriented with its reflective surface 40 below, and in reflective relation with, aperture 32 and member 90. In practice, and as will be discussed in more detail below, the light beam, if it is entering LTR 10 through aperture 32, will then reflect off of reflective surface 40 of mirror panel 34, and propagate through member 90 into roof mirror assembly housing 60, where it will reflect off of reflective surfaces 104 and 114 of roof mirror assembly 100 to propagate back toward the source of the beam, in a direction substantially parallel to the beam's incident direction, but at a displaced distance, substantially based upon the length of member 90.

Figure 4A:
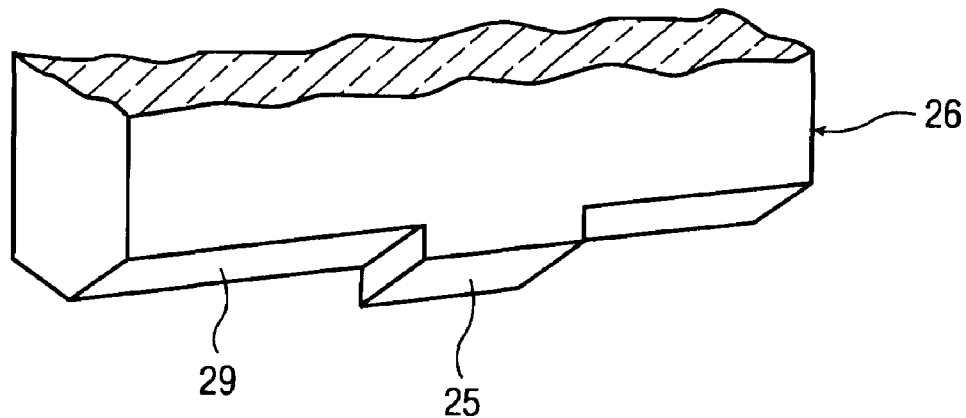
FIG. 4A is a partial perspective view of the mounting pad of member 26 of the mirror panel housing.
Figure 4B:
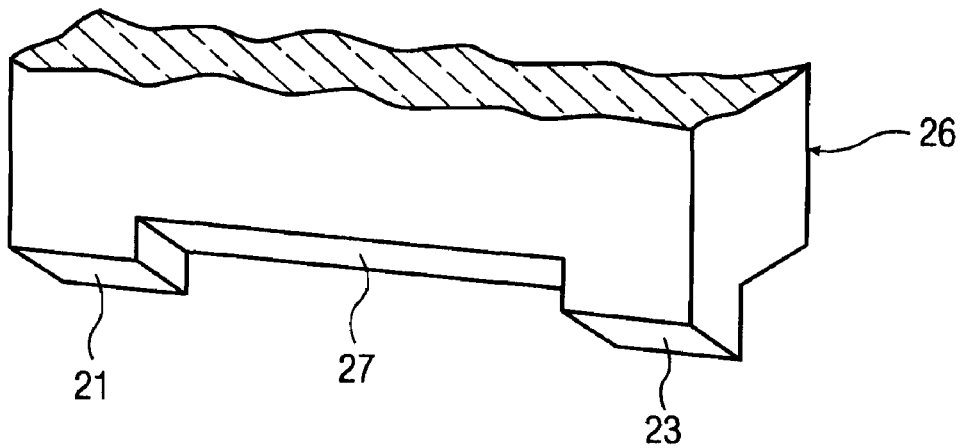
FIG. 4B is a partial perspective view of the mounting pad of member 24 of the mirror panel housing.
Figure 5:
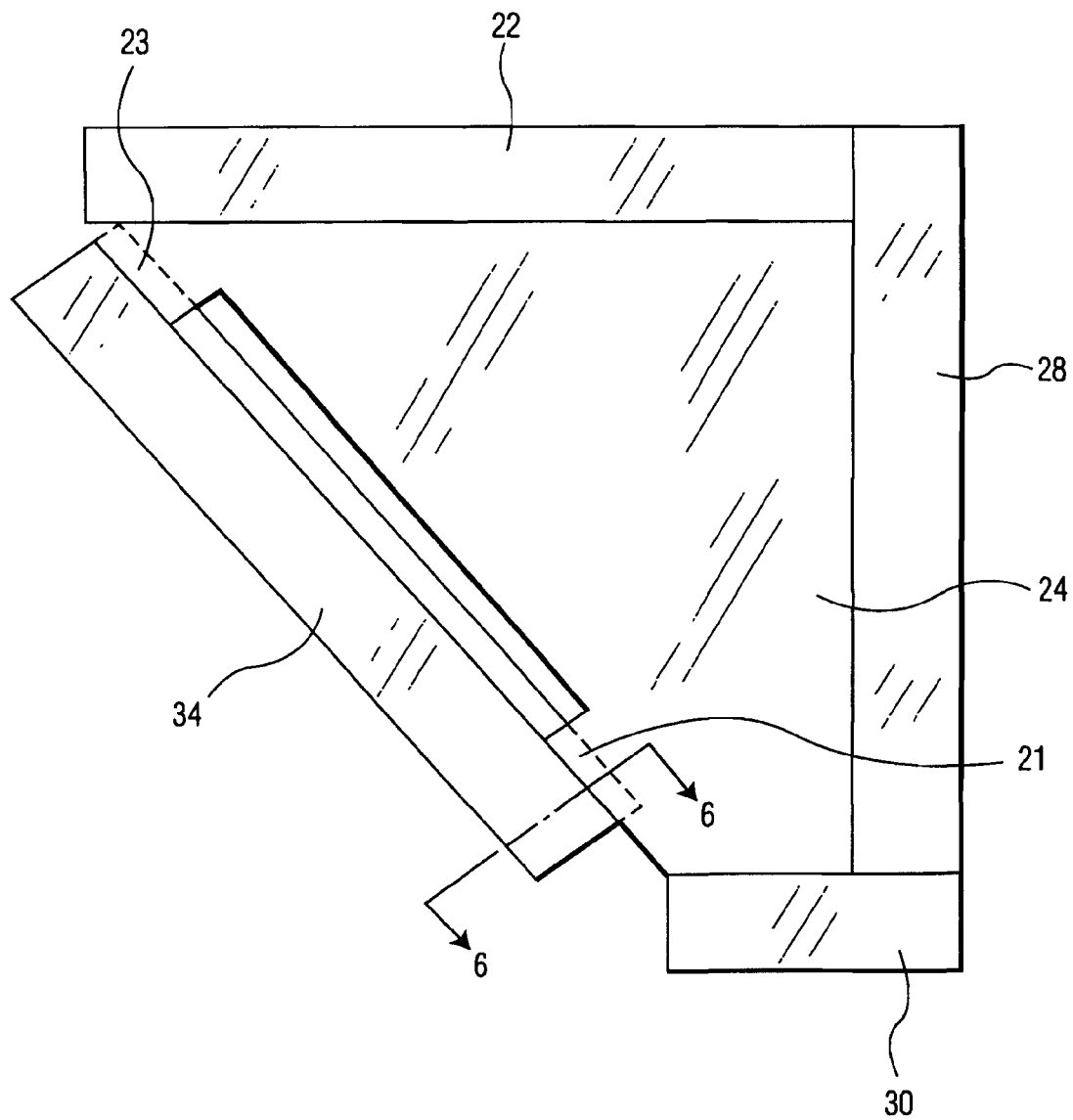
FIG. 5 is a right side elevational view of the mirror panel housing.
Figure 6:
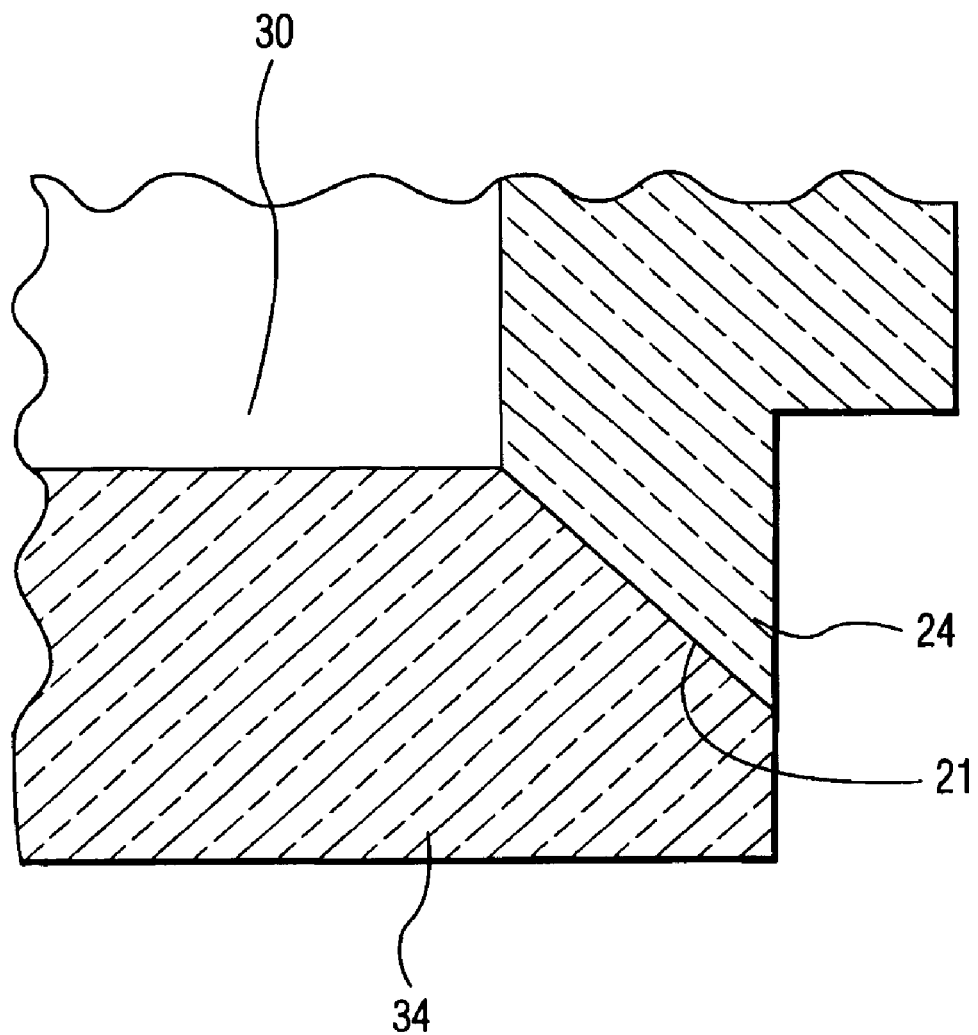
FIG. 6 is a cross-sectional view taken along line 6—6 of FIG. 5.
Figure 7:
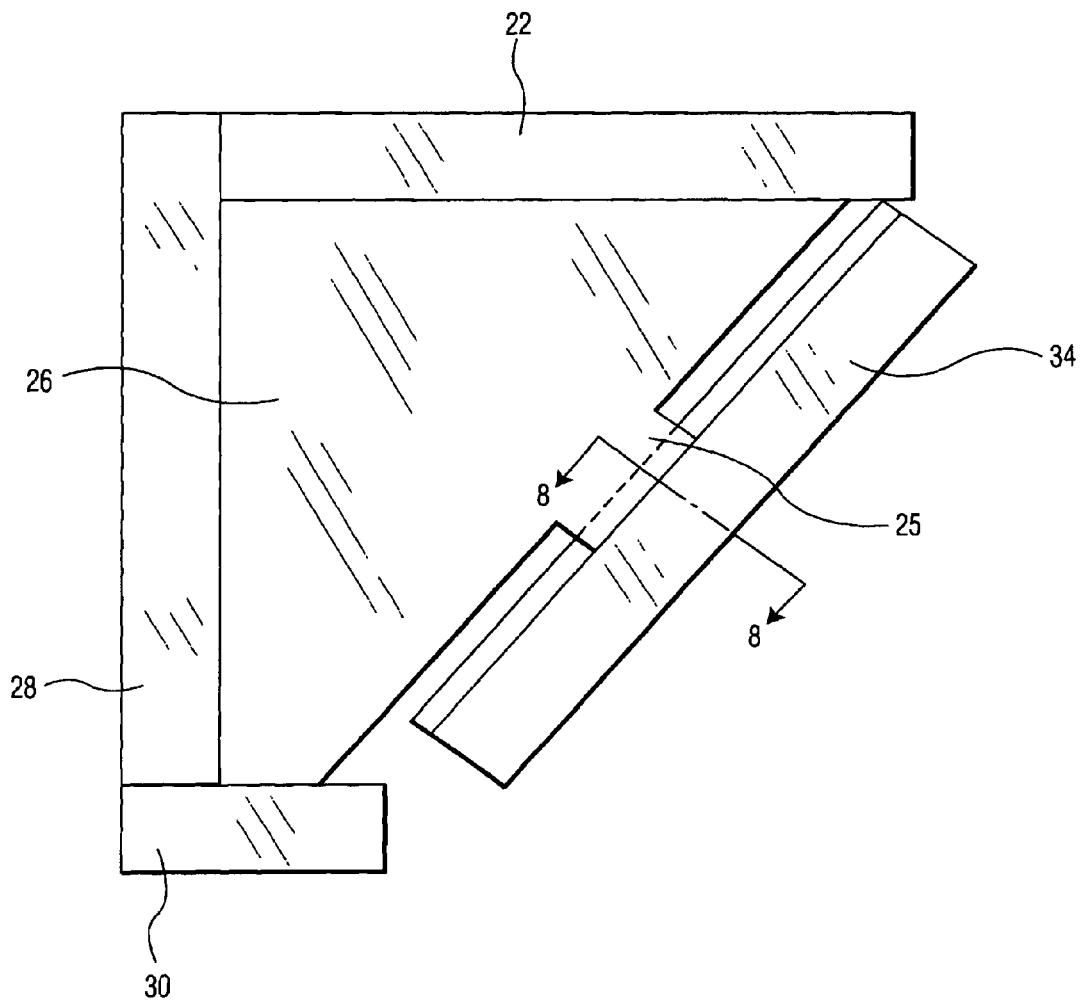
FIG. 7 is a left side elevational view of the mirror panel housing.
Figure 8:
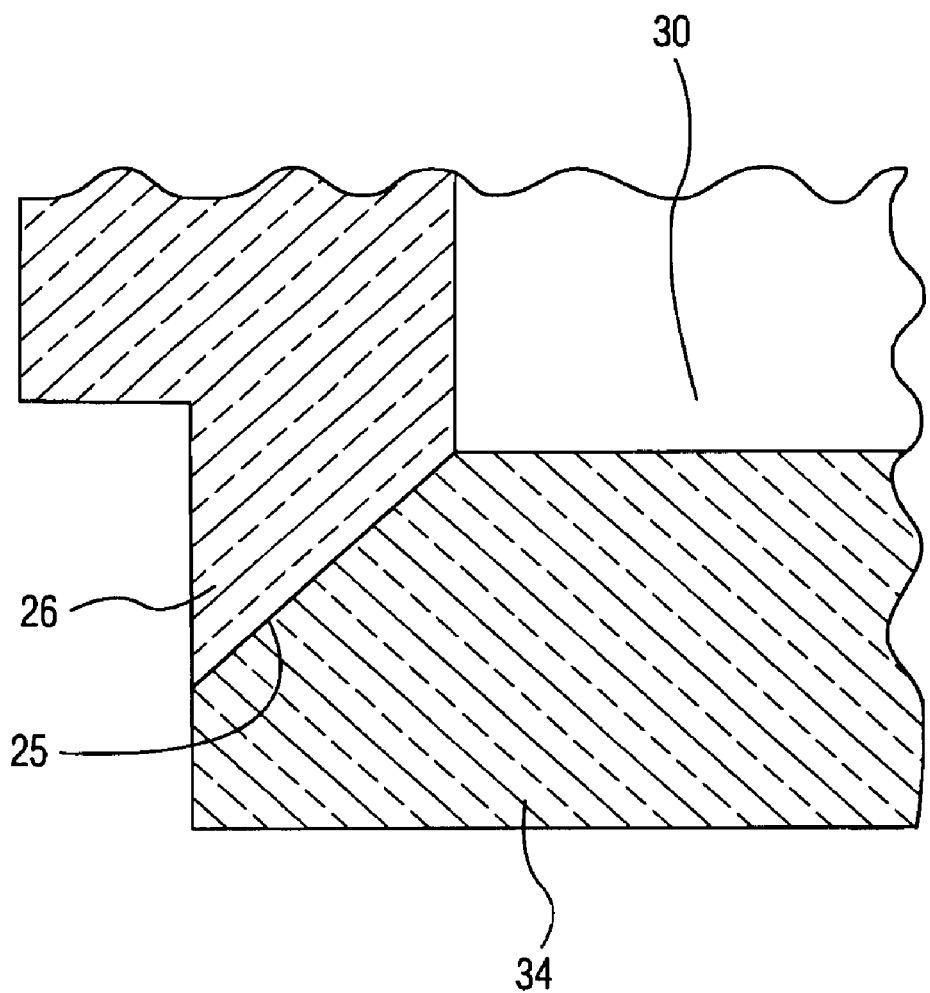
FIG. 8 is a cross-sectional view taken along line 8—8 of FIG. 7.

Continuing with FIGS. 3–8, it is seen that mirror panel 34 is adhered at three contact surfaces to corresponding mounting pads 21, 23, and 25 of edge portions 27 and 29 of first and second side members 24 and 26, respectively. In particular, edge portions of 27 and 29, and their corresponding mounting pads 21, 23 and 25, onto which mirror panel 34 is adhered, are themselves chamfered, as is best seen in FIGS. 4A and 4B. The construction and mounting of mirror panel 34 of the subject invention is different to that of the prior art in U.S. Pat. Nos. 5,024,514 and 5,361,171 (discussed earlier herein), in that the subject connection between mirror panel 34 and mirror panel housing 20 is chamfered surface to chamfered surface, as opposed to the prior art disclosure of mounting pads oriented perpendicularly to the reflective surface. What is similar, however, between the subject connection of mirror panel 34, and the prior art connections, is the adhesion of mirror panel 34 to mirror panel housing 20 at only three distinct areas; two areas along chamfered surface 38 and only one area along chamfered surface 36. The use of the matching chamfered surfaces 36/38 and 21/23 and 25 helps to reduce the distortional effect of the connection of mirror panel 34 to mirror panel housing 20, as well as to help reduce stresses caused by thermal expansion/contraction, as the substantially 45° of the chamfers insures that such distortional forces do not distort rereflective surface 40 in a way to effect the orientation of the beam passing through LTR 10.

Turning now to a discussion of a first embodiment of a roof mirror assembly of the invention, attention is first directed to roof mirror assembly 100 of FIGS. 9–12. Roof mirror assembly 100 comprises a pair of mirror panels 102 and 112, and a pair of mounting blocks 140 and 160, although the invention does not anticipate a fixed number of mounting blocks, so long as at least one such mounting block exists.

Mirror panels 102 and 112 have reflective surfaces 104 and 114, respectively, which reflective surfaces are in reflective relation with reflective surface 40 of mirror panel 34, as well as member 90 and aperture 32, when roof mirror assembly 100 is secured within roof mirror housing 60 of LTR 10. Each of mirror panels 102 and 112 also has aback portion 116 and 106, respectively. In particular, reflective surface 104 is substantially perpendicularly oriented to reflective surface 114, and reflective surface 40 is itself oriented substantially perpendicularly to both reflective surfaces 104 and 114. This mutually perpendicular orientation of the three reflective surfaces of LTR 10 essentially duplicates the construction of a standard Hollow™ retroreflector as is known in the art, except that reflective surface 40 is offset a distance from reflective surfaces 104 and 114.

Figure 9:
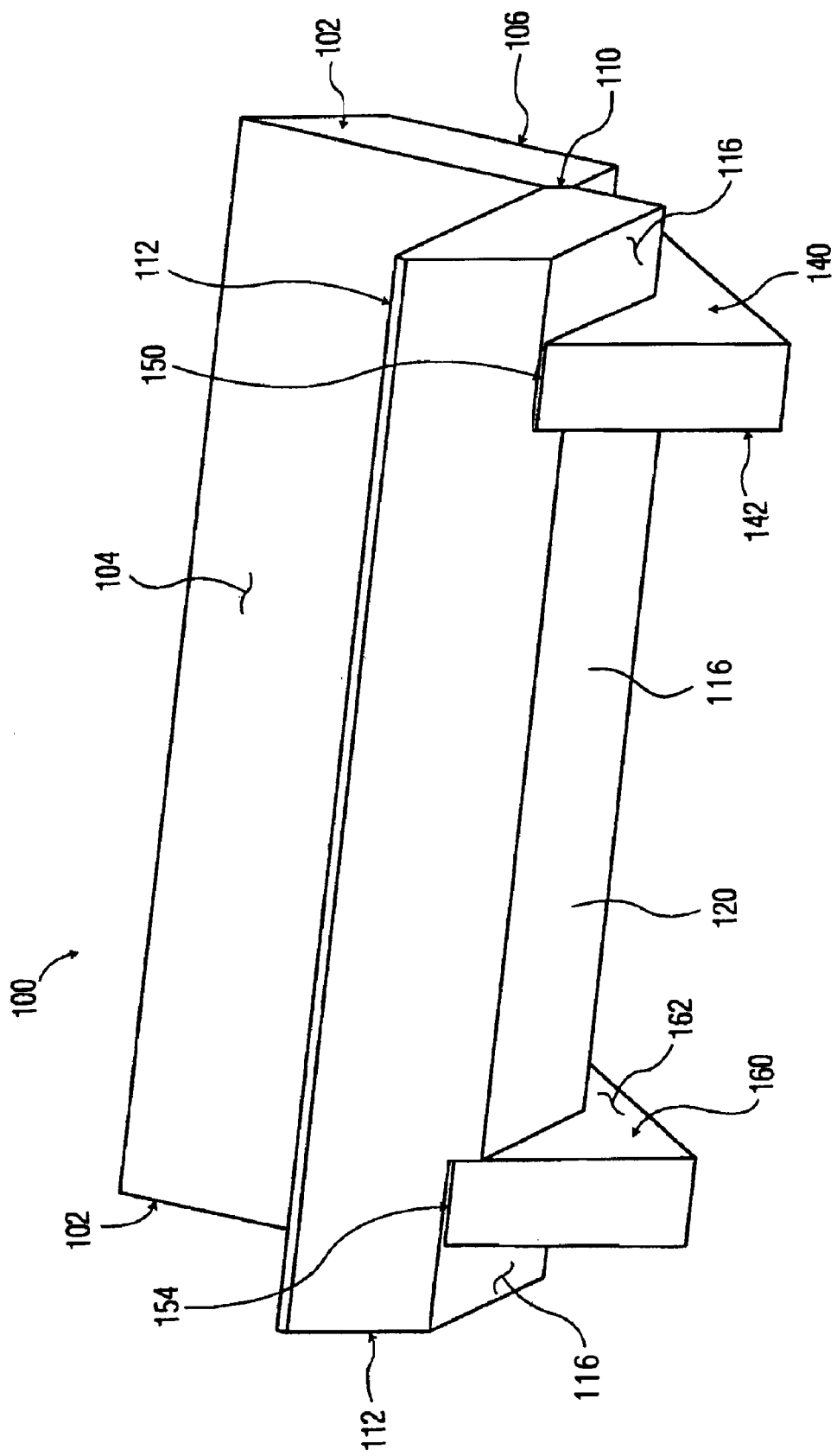
FIG. 9 is a perspective view of a roof mirror assembly made in accordance with the subject invention.
Figure 10:
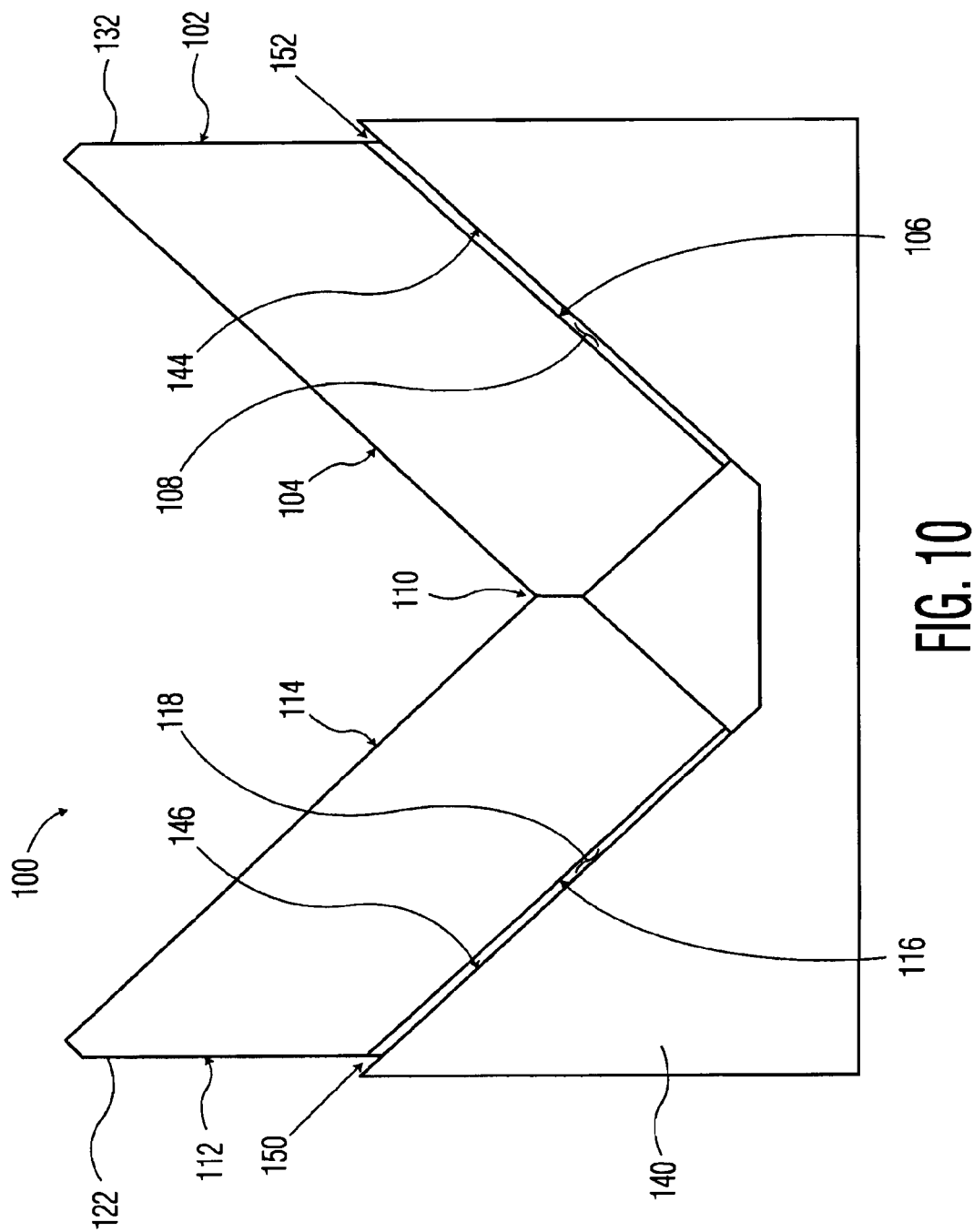
FIG. 10 is an elevational view of one end of the roof mirror assembly of FIG. 9.
Figure 11:
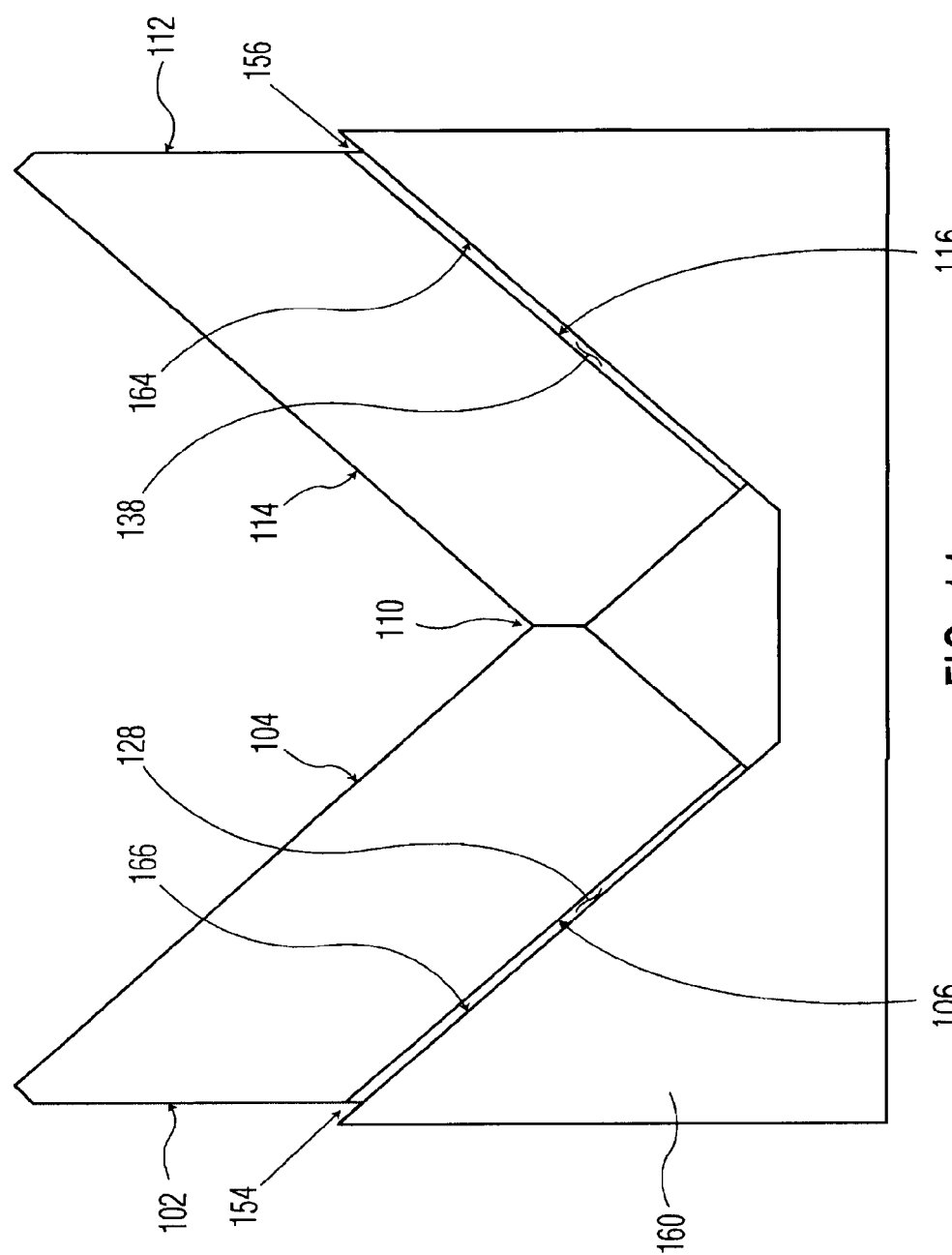
FIG. 11 is an elevational view of the other end of the roof mirror assembly of FIG. 9.
Figure 12:
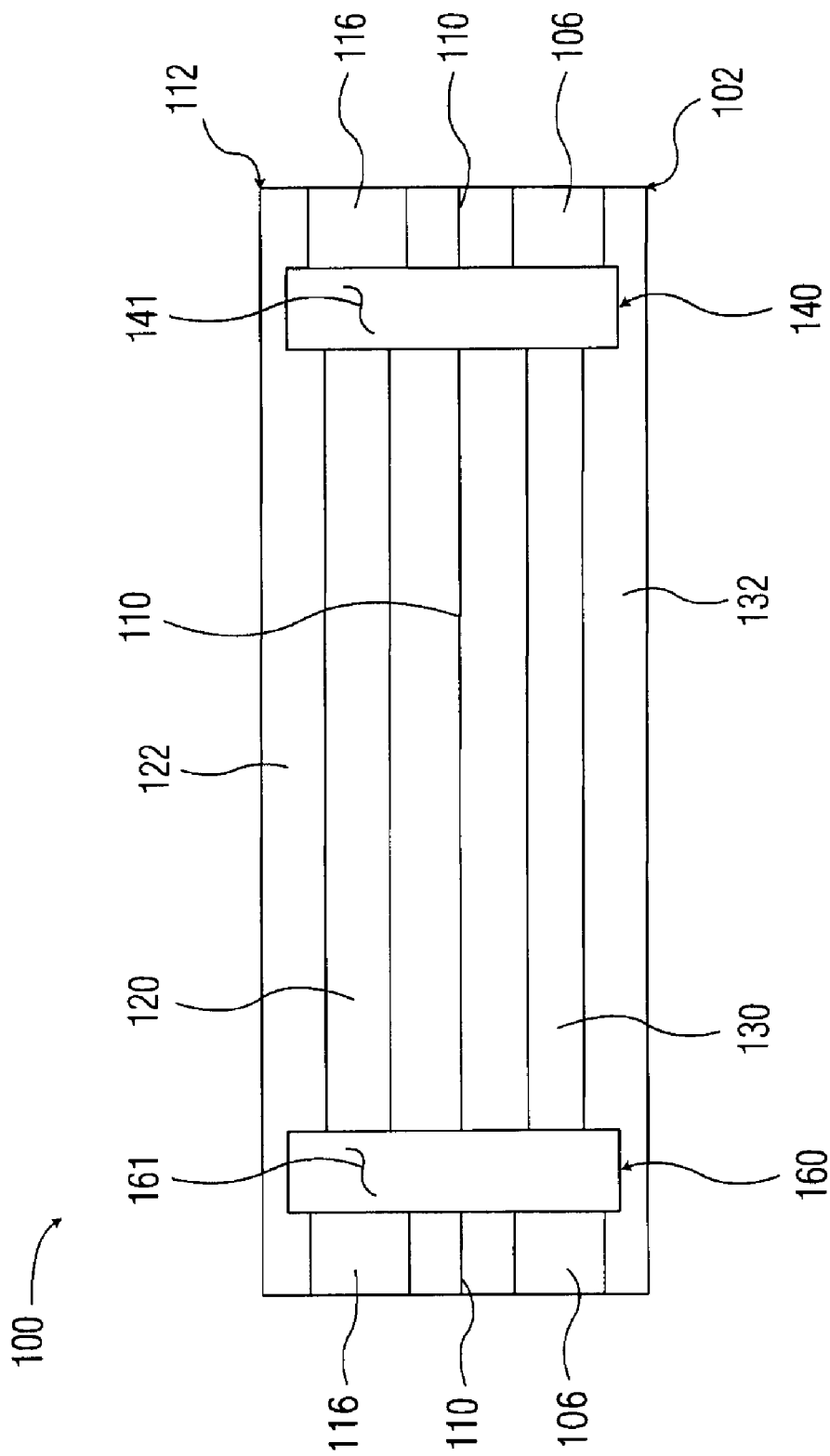
FIG. 12 is a bottom plan view of the roof mirror assembly of FIG. 9.
Figure 16:
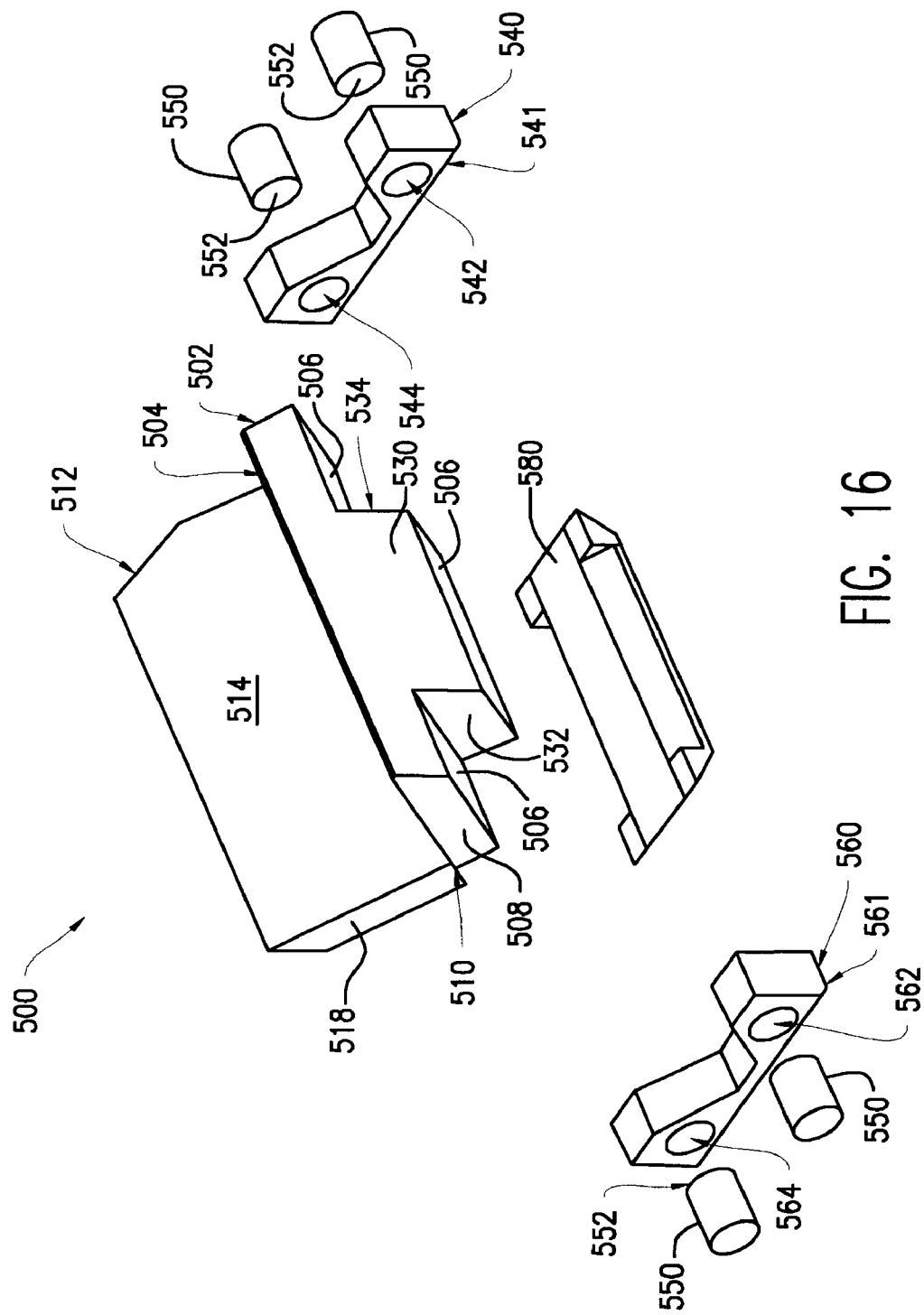
FIG. 16 is an exploded perspective view of still another embodiment of a roof mirror assembly made in accordance with the subject invention.

Continuing with the roof mirror assembly embodiment of FIGS. 9–11, mirror panels 102 and 112 are seen to be adhered together at joint 110. In a preferred embodiment, this joining together is achieved through a miter joint connection, although other manners of joining the two panels are anticipated herein as are known in the art and, for example, as is shown in the embodiment of FIG. 16, so long as reflective surfaces 104 and 114 are substantially perpendicular to each other. In order to create miter joint 110, the attachment surfaces of mirror panels 102 and 112 which are joined together to create miter joint 110, are at substantially 45 degree angles to reflective surfaces 104 and 114. Such a dual 45 degree angle connection between these two surfaces results in the perpendicularity between reflective surfaces 104 and 114, and helps to provide the associated reduction in distortive forces to the optical flatness of the reflective surfaces, as earlier discussed.

Continuing with a discussion of FIGS. 9–11, it is seen that connected together panels 102 and 112 are finally formed into a secure roof mirror assembly through the mounting thereto, against back portions 106 and 116, of mounting blocks 140 and 160. While the preferred embodiment is for use of a pair of mounting blocks, the invention anticipates that so long as at least one mounting block is used, the inventive results are achieved. However, in so mounting panels 102 and 112 to blocks 140 and 160 as shown in the embodiment of FIGS. 9–12, air gaps 150,152, 154 and 156 are created. Air gap 150 is between surface 146 of mounting block 140 and surface 116 of panel 112. Air gap 152 is between surface 144 of mounting block 140 and surface 106 of panel 102. Air gap 154 is between surface 166 of mounting block 160 and surface 106 of panel 102. Air gap 156 is between surface 164 of mounting block 160 and surface 116 of panel 112. (See, FIGS. 10 and 11).

As is further seen in FIGS. 9–12, back portions 106 and 116 of panels 102 and 112, can have protruding elements 120 and 130, which protrude, in a preferred embodiment, in a direction generally away from reflective surfaces 104/114, respectively, although other protrusion directions are anticipated by the invention. In particular, as the primary purpose of the protruding elements is to provide receiving surfaces for attaching the mounting block(s) to the back portions of the mirror panels, so long as such receiving surfaces are created, the overall shape and protruding direction of the protruding elements is not important. In particular, as is best seen in FIG. 9 as regards mirror panel 112, protruding element 120 extends from back portion 116 and mounting blocks 140 and 160 are attached thereto (preferably through use of some type of adhesive) along surfaces 142 and 162, respectively. As is best seen in FIGS. 10 and 11, surface 142 is attached to receiving surface 108 for mirror panel 102 and to receiving surface 118 for mirror panel 112, while surface 162 is attached to receiving surface 128 for mirror panel 102 and to receiving surface 138 for mirror panel 112. Each of these receiving surfaces for this embodiment of the inventive roof mirror construction are aligned in a substantially perpendicular plane to the plane of the corresponding reflective surface for that receiving surface's mirror panel. For example, receiving surfaces 108 and 128 of protruding element 130 of mirror panel 102 lie in planes that are substantially perpendicular to a plane corresponding to reflective surface 104, while receiving surfaces 118 and 138 of protruding element 120 of mirror panel 112 lie in planes that are substantially perpendicular to a plane corresponding to reflective surface 114. In addition, in this orientation, receiving surfaces 108, 118, 128 and 138 are also all substantially perpendicular to miter joint 110. Such a construction helps to ensure that any substantial distortional effects due to thermal expansion/contraction of panels 102 and 112 and/or blocks 140 and 160 will be in a direction substantially perpendicular to a longitudal axis for roof mirror assembly 100; i.e., perpendicular to the planes of reflective surfaces 104 and 114.

Turning again to FIG. 1, it is seen that roof mirror assembly 100 is secured to roof mirror assembly housing 60 by way of connection between bottom surfaces 141 and 161 of blocks 140 and 160 (see FIG. 12) to member 70 of housing 60. Such a secure connection of roof mirror assembly 100 to housing 60 assists and strengthens the durability of LTR 10.

Figure 13:
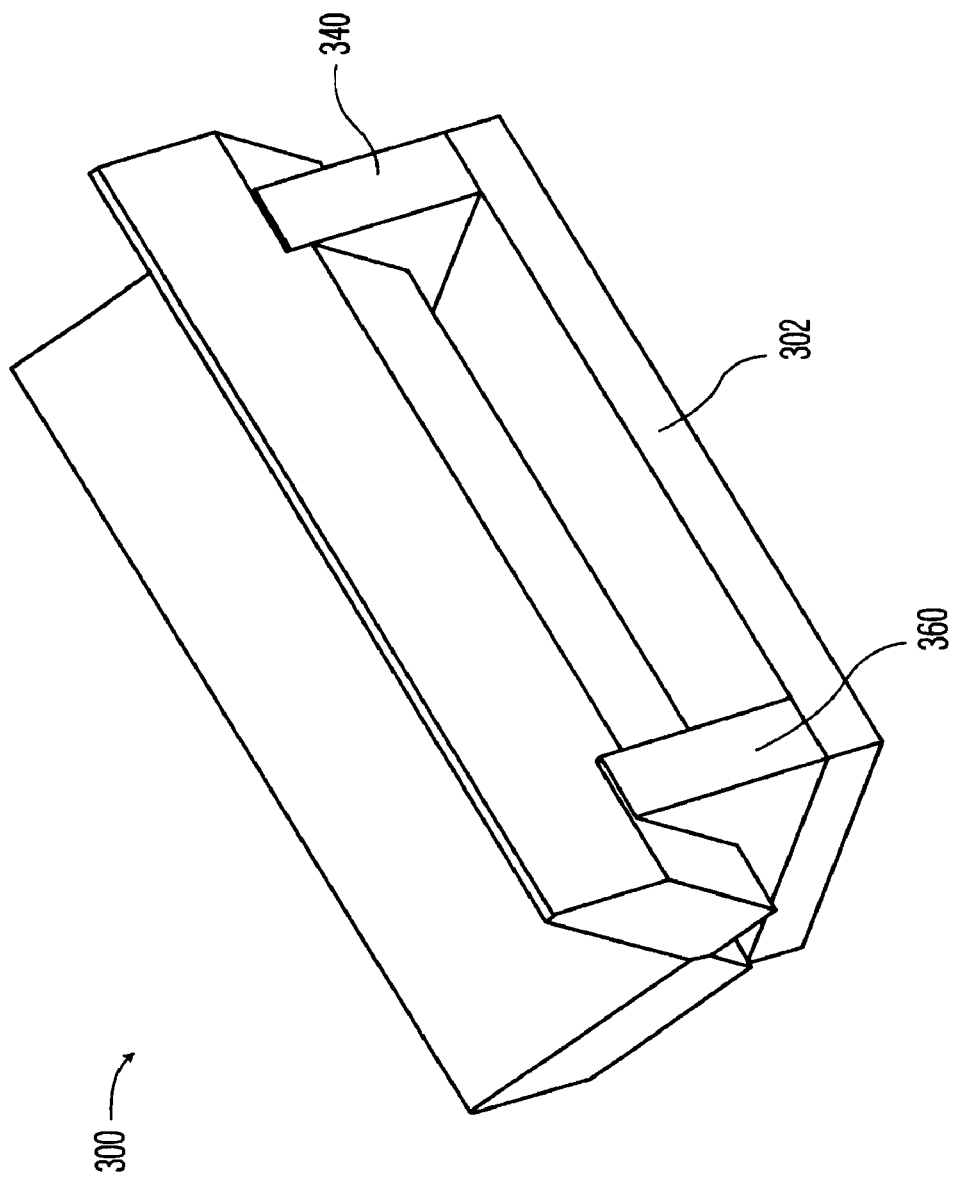
FIG. 13 is a perspective view of another embodiment of a roof mirror assembly made in accordance with the subject invention.

Turning now to a discussion of FIG. 13, another embodiment of the inventive roof mirror assembly is shown at 300. Assembly 300 is constructed identically to that of assembly 100, accept for the addition of back plate member 302, adhered below mounting blocks 340 and 360, to surfaces 341 and 361 (not shown).

Figure 14:
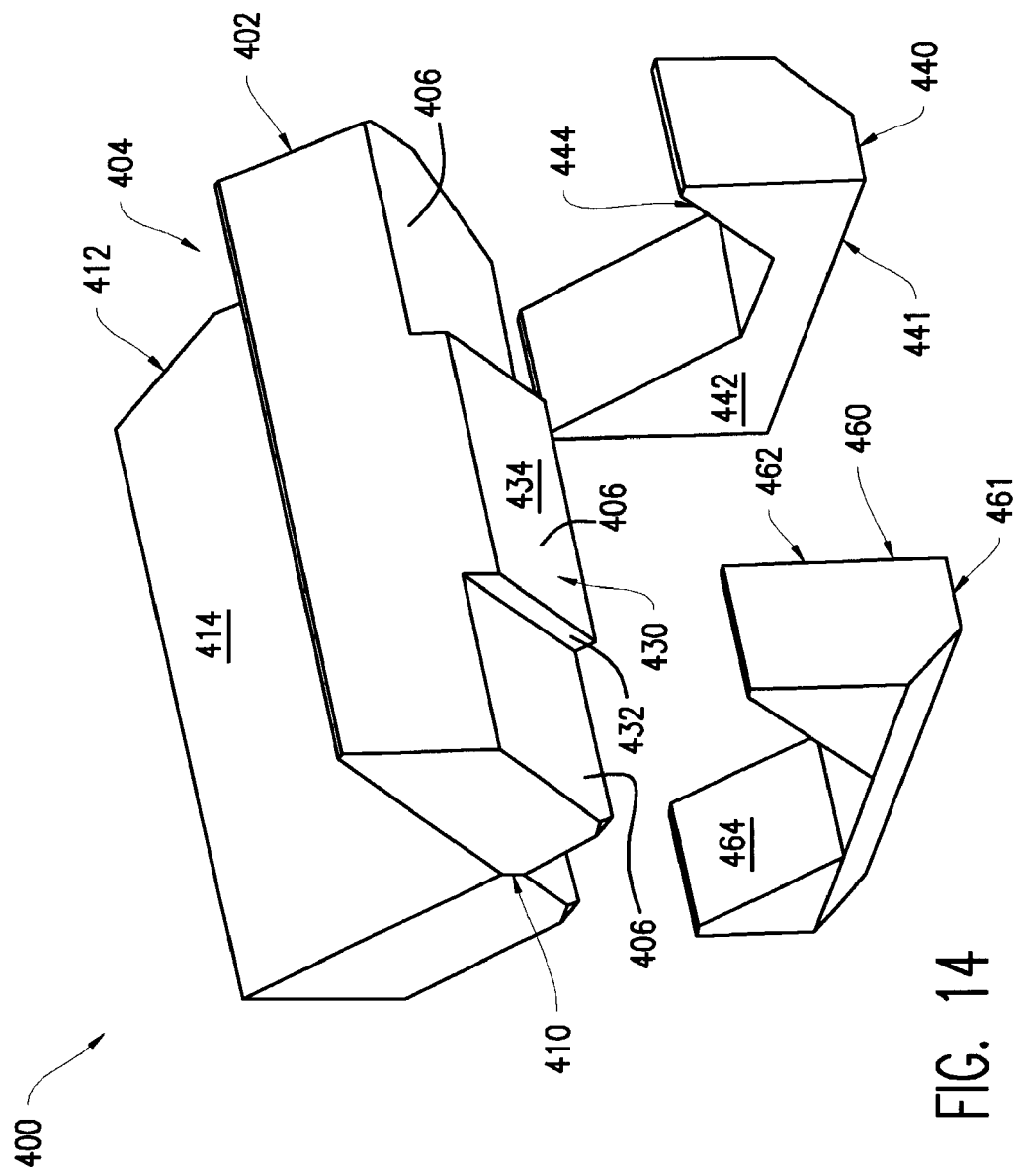
FIG. 14 is an exploded perspective view of yet another embodiment of a roof mirror assembly made in accordance with the subject invention.

Directing attention now to the embodiment of a roof mirror assembly as shown in FIGS. 14 and 15A and B, roof mirror assembly 400 is provided. This assembly has first and second mirror panels 402 and 412, having substantially perpendicular reflective surfaces 404 and 414, respectively. Panels 402 and 412 further have back portions 406 and 416, respectively. In this embodiment, back portions 406 and 416 can have corresponding protruding elements 430 and 420. In a preferred, but not mandatory, construction, mirror panels 402 and 412 are adhered together at miter joint 410, although other manners of joining the two surfaces are anticipated herein as are known in the art and, for example, as are seen in the embodiment of FIG. 16. In order to create miter joint 410, the attachment surfaces of mirror panels 402 and 412 which are joined together to create miter joint 410, are at substantially 45 degree angles to reflective surfaces 404 and 414. Such a dual 45 degree angle connection between these two surfaces results in the perpendicularity between reflective surfaces 404 and 414, and helps to provide the associated reduction in distortive forces to the optical flatness of the reflective surfaces, as earlier discussed.

Figure 15:
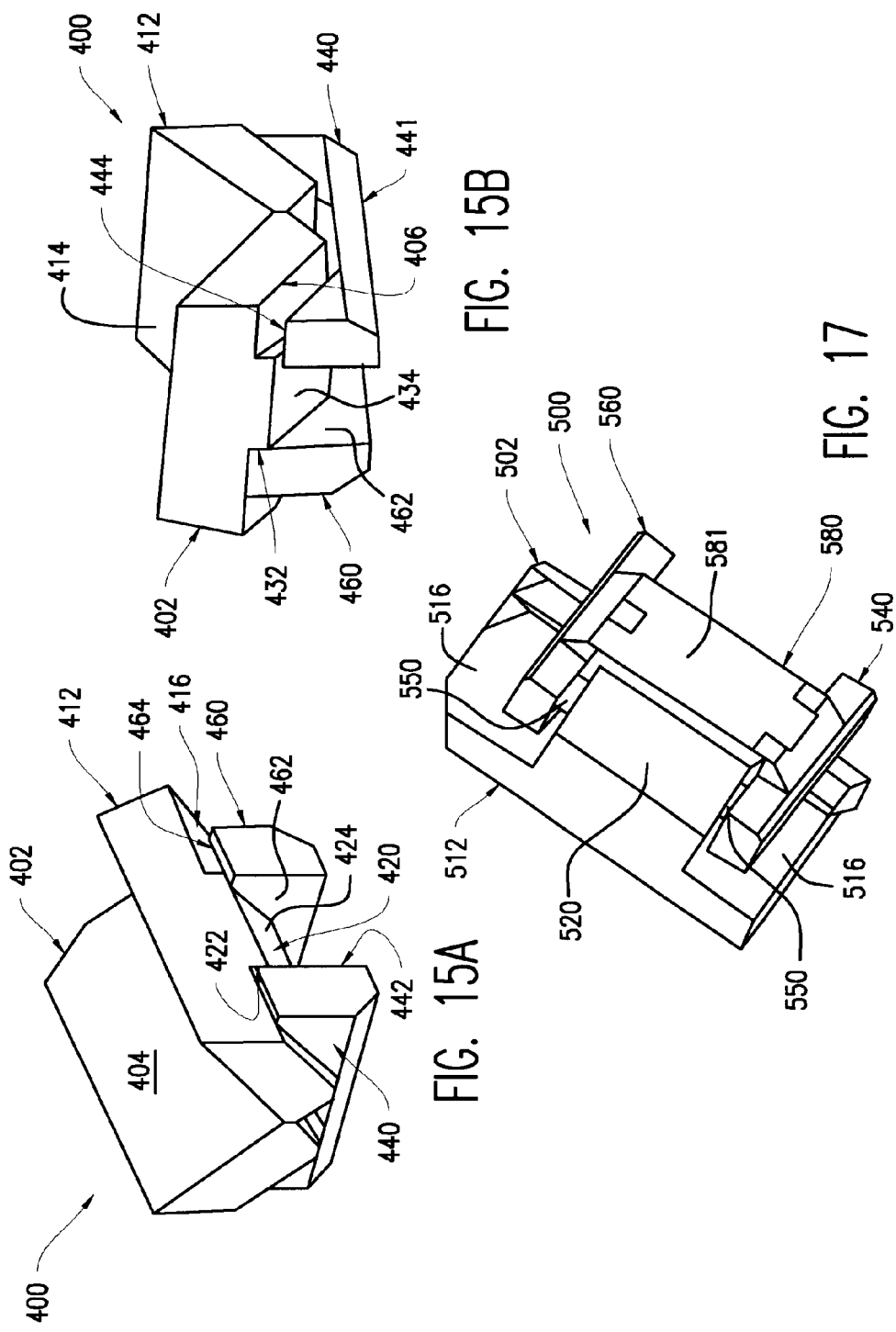
FIGS. 15A and B are a perspective views of the assembled roof mirror of FIG. 14, from opposite directions.

Continuing with a discussion of FIGS. 14 and 15, it is seen that connected together panels 402 and 412 are finally formed into a secure roof mirror assembly 400 through the mounting thereto, against back portions 406 and 416, of mounting blocks 440 and 460. While the preferred embodiment is for use of a pair of mounting blocks, the invention anticipates that so long as at least one mounting block is used, the inventive results are achieved.

As is further seen in FIGS. 14 and 15, back portions 406 and 416 of panels 402 and 412, have protruding elements 430 and 420, respectively, which protrude, in a preferred embodiment, in a direction generally away from reflective surfaces 404/414, respectively, although other protrusion directions are anticipated by the invention. In particular, as the primary purpose of the protruding elements is to provide receiving surfaces for attaching the mounting block(s) to the back portions of the mirror panels, so long as such receiving surfaces are created, the overall shape and protruding direction of the protruding elements is not as important; although in this embodiment (as opposed to the embodiment of FIGS. 9–12), portions of receiving surfaces 434 and 424 which, as will be discussed in more detail below, extend along a plane substantially parallel to a plane of its corresponding reflective surface for attachment to a portion of one of the mounting blocks, so that a little more weight is given in this embodiment to the overall shape and orientation of the protruding elements. In particular, as seen in FIG. 15A as regards mirror panel 412, protruding element 420 extends from back portion 416 and mounting blocks 440 and 460 are attached thereto (preferably through use of some type of adhesive) along surfaces 442 and 464, respectively, not surface 462 as would have been the case in the earlier discussed embodiment of FIGS. 9–12. To achieve this construction, protruding element 420 is offset from a "centered" position extending from back portion 416, so that it is able to be attached along its substantially perpendicularly running receiving surface 422 to surface 442 of mounting block 440, while surface 464 of mounting block 460 is attached to substantially parallel running receiving surface 424 of protruding element 420. In like fashion, and as seen best in FIG. 15B, protruding element 430 is offset from a "centered" position extending from back portion 406, so that it is able to be attached along its substantially perpendicularly running receiving surface 432 to surface 462 of mounting block 460, while surface 444 of mounting block 440 is attached to substantially parallel running receiving surface 434 of protruding element 430.

As with the earlier embodiment of FIGS. 9–12, roof mirror assembly 400 is secured to roof mirror assembly housing 60 by way of connection between bottom surfaces 441 and 461 of blocks 440 and 460 (see FIG. 14) to member 70 of housing 60. Such a secure connection of roof mirror assembly 400 to housing 60 helps to assist and strengthen the durability of LTR 10. Further, a back plate member (not shown) similar in construction and purpose to member 302 of FIG. 13 would also be available for the roof mirror assembly of this embodiment.

Directing attention now to the embodiment of a roof mirror assembly as shown in FIGS. 16 and 17, roof mirror assembly 500 is provided. This assembly has first and second mirror panels 502 and 512, having substantially perpendicular reflective surfaces 504 and 514, respectively. Panels 502 and 512 further have back portions 506 and 516, respectively. In this embodiment, back portions 506 and 516 have corresponding protruding elements 530 and 520. In a preferred, but not mandatory, construction, mirror panels 502 and 512 are adhered together at 510, this joining together being achieved through a miter joint connection similar in construction to the earlier embodiments discussed herein, or through some other known manner of so attaching mirror panels or through the overlap connection shown in FIG. 16. The overlap connection of FIG. 16 is achieved simply by having at least a portion of an edge of one of the mirror panels attached to a portion of the reflective surface of the other mirror panel, or some equivalent surface portion of the other mirror panel (for example, it is possible that the optically reflective surface of the mirror panel does not extend completely over the corresponding surface of the panel so that a small strip of the surface remains non-optically reflective and the edge of the other panel is attached along this small strip of surface).

Continuing with a discussion of FIGS. 16 and 17, it is seen that connected together panels 502 and 512 are finally formed into a secure roof mirror assembly 500 through the mounting thereto, against back portions 506 and 516, of mounting blocks 540 and 560. While the preferred embodiment is for use of a pair of mounting blocks, the invention anticipates that so long as at least one mounting block is used, the inventive results are achieved.

As is further seen in FIGS. 16 and 17, back portions 506 and 516 of panels 502 and 512, have protruding elements 530 and 520, respectively, which protrude, in a preferred embodiment, in a direction generally away from reflective surfaces 504/514, respectively, creating receiving surfaces 532/534 and 522/524, respectively, although other protrusion directions are anticipated by the invention. In particular, as the primary purpose of the protruding elements is to provide receiving surfaces for attaching the mounting block(s) to the back portions of the mirror panels, so long as such receiving surfaces are created, the overall shape and protruding direction of the protruding elements is not as important.

In this embodiment of the roof mirror assembly, mounting blocks 540 and 560 are attached to protruding elements 530 and 520 through openings in the mounting blocks and mounting pins 550 attached within the openings and also attached to the protruding elements receiving surfaces. In particular, in the particular embodiment of the roof mirror shown in FIGS. 16 and 17, each mounting block has two openings extending therethrough; openings 542 and 544 for mounting block 540, and openings 562 and 564 for mounting block 560. For this embodiment, through each of these openings is received a mounting pin 550, which pins are shown in the figures as having a circular cross-section, but it is understood that any cross-section is anticipated by the invention. The pins are adhered within the openings and their ends 552 are adhered to their respective receiving surfaces, as is best seen in FIG. 17. It is also to be understood that the number of openings, and therefore the number of corresponding pins, can vary, depending on the size of the roof mirror assembly. It is still further to be understood that in a preferred embodiment, the cross-sectional diameter of the pins, alone the entire length of the pins, is sized to be able to fit within the openings.

As with the earlier embodiment of FIGS. 9–12, roof mirror assembly 500 is secured to roof mirror assembly housing 60 by way of connection between bottom surfaces 541 and 561 of blocks 540 and 560 (see FIG. 16) to member 70 of housing 60. Such a secure connection of roof mirror assembly 500 to housing 60 helps to assist and strengthen the durability of LTR 10. Further, and as an alternate manner of attaching assembly 500 to housing 60, in addition to mounting blocks 540 and 560 there can exist an optional mounting block connecting element 580. This element is preferably, but not mandatorily, made of the same material as the mounting blocks so as to reduce differences in the coefficient of expansion/contraction, and is attached under the mounting blocks along surfaces 541 and 561 and then the bottom surface 581 of element 580 is attached to roof mirror assembly housing 60, in a manner substantially similar to member 302 of FIG. 13.

Figure 18:
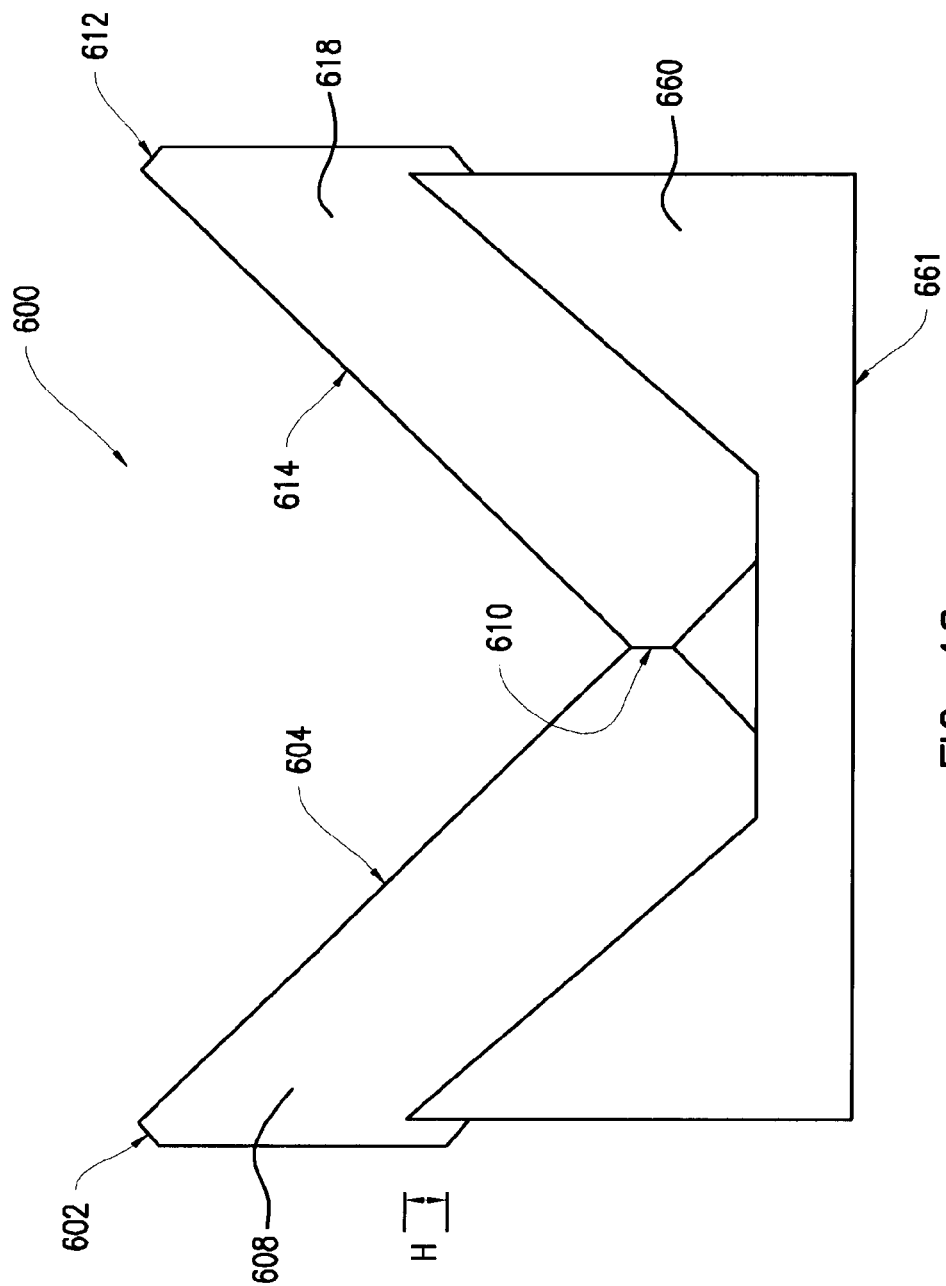
FIG. 18 is an elevational view of one end of a further embodiment of a roof mirror assembly made in accordance with the subject invention.

Finally, FIG. 18 is directed to another embodiment of the invention. In this construction, roof mirror assembly 600 is comprised of mirror panels 602 and 612, having substantially perpendicular reflective surfaces 604 and 614, respectively, and being joined at miter joint 610. Miter joint 610 is formed and functions in the same manner as the earlier discussed miter joints 110 and 410, and is also able to be substituted therefore by another type of connection between the mirror panels known in the art (as for example, the overlapping connection shown in FIG. 16). The distinction between the embodiment of FIG. 18 and the other embodiments already discussed is that mounting block 660, is not attached to back portions of panels 602 and 612, but is instead attached to ends 608 and 618 along narrow areas of contact, as seen at H. For those situations when a second block assembly is required, a similar construction is found at the other end of assembly 600, but is not shown herein. Accordingly, this end-mounted block construction is an alternate construction for all of the assemblies already discussed herein.

As with the earlier embodiments, roof mirror assembly 600 is secured to roof mirror assembly housing 60 by way of connection between bottom surfaces of the mounting block(s) (for example, bottom surface 661) to member 70 of housing 60. Such a secure connection of roof mirror assembly 600 to housing 60 helps to assist and strengthen the durability of LTR 10. Further, and as an alternate manner of attaching assembly 600 to housing 60, in addition to the mounting blocks there can exist an optional back plate member (similar to that found at 302, not shown in this embodiment), adhered below the mounting block(s) to the bottom surfaces (for example, 661). Such an element would preferably be made of the same material as the mounting blocks so as to reduce differences in the coefficient of expansion/contraction.

The end-mounted block construction of FIG. 18 and back portion mounted block constructions of FIGS. 9–17, allow for use of substantially all of the reflective surfaces of the mirror panels of the roof mirror assemblies, since these mounting blocks do not interfere in any way with the path of any light beam incident to or reflected from the roof mirror assemblies when the assemblies are in use. Accordingly, use of the roof mirror assemblies of the invention herein allows the effective length of the mirror panels to be greater than in past roof mirror constructions, which longer effective length could be important if these assemblies are used in otherwise small devices.

Regarding connecting member 90, as has been stated, this member can be cut from an off-the-shelf member of standard construction and length. Such an off-the-shelf retro-fit of connecting member 90 allows one to stock separate quantities of housings 20 and 60, and member 90, for construction of an LTR 10 to meet any customer specifications, in a quick and cost affective manner.

It is also anticipated herein that the mounting pin construction of FIGS. 16 and 17 could be upon mirror panel ends 508 and/or 518 (or for that matter, ends 608 and/or 618, as shown in FIG. 18). In such a construction, mounting pins 550 would be attached to these ends of the mirror panels, as opposed to the receiving surfaces of the protruding elements.

Unless otherwise expressly indicated, when used throughout this document the term "substantially" shall have the meaning of "approximation", not "magnitude"; i.e., it shall have the meaning, "being largely but not wholly that which is specified." *See, Webster's Ninth New Collegiate Dictionary*, Merriam-Webster Inc., 1989.

Further, unless otherwise expressly indicated, when used throughout this document the term "block" is not meant to be restricted to a standard rectangularly shaped member, but is meant to cover a broad range of shapes having a broad range of integrities, as for example, solid, hollow, partially solid, etc. In addition, various constructions of the mounting block are anticipated herein.

It will thus be seen that the objects set forth above, among those made apparent from the preceding description, are efficiently attained, and, since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language might be said to fall therebetween.

What is claimed is:

1. A roof mirror assembly, comprising:
first and second mirror panels comprising first and second reflective surfaces and first and second mounting surfaces, respectively, wherein each of said first and second mounting surfaces are substantially perpendicular to each of said first and second reflective surfaces, and wherein said first and second mirror panels being joined together so that said first and second reflective surfaces are substantially perpendicular to each other;
at least one mounting block comprising at least one opening extending through a portion thereof; and
at least one mounting pin received within said at least one opening of said at least one mounting block, wherein said at least one mounting pin is attached within said opening to said at least one mounting block and is attached to at least one of said first or second mounting surfaces of said first or second mirror panels.

2. A roof mirror assembly as recited in claim 1, said at least one mounting pin is attached using adhesive material.

3. A roof mirror assembly as recited in claim 1, further comprising a back plate member attached below said at least one mounting block.

4. A roof mirror assembly as recited in claim 1, said at least one mounting block being first and second mounting blocks and said at least one mounting pin being at least first and second mounting pins.

5. A roof mirror assembly as recited in claim 1, said first and second mounting surfaces being end surfaces of said first and second mirror panels, respectively.

6. A roof mirror assembly as recited in claim 1, each of said mirror panels further comprising at least one protruding element extending from a back portion thereof in a direction generally away from said reflective surface of said mirror panel, said at least one protruding element forming at least one receiving surface extending along portions thereof.

7. A roof mirror assembly as recited in claim 6, said at least one receiving surface of said first mirror panel being said first mounting surface and said at least one receiving surface of said second mirror panel being said second mounting surface.

8. A roof mirror assembly as recited in claim 1, said first mirror panel further having a first edge surface lying in a plane substantially oriented at a 45° angle to a plane of said first reflective surface and said second mirror panel further having a second edge surface lying in a plane substantially oriented at a 45° angle to a plane of said second reflective surface, wherein said first and second edge surfaces are joined together creating a common plane substantially oriented at a 45° angle to both of said planes of said reflective surfaces, and further wherein said joining together of said panels along said common plane causes said first and second reflective surfaces of said mirror panels to be oriented substantially perpendicular to each other.

9. A roof mirror assembly as recited in claim 8 wherein said first and second edge surfaces are joined together creating a miter joint.

10. A roof mirror assembly as recited in claim 1, wherein said first and second mirror panels and said at least one mounting block are formed of the same material.

11. A roof mirror assembly as recited in claim 10, said material having dimensional stability with respect to changes in temperature.

12. A roof mirror assembly as recited in claim 11, wherein said material is one of fused quartz or annealed Pyrex.

13. A roof mirror assembly as recited in claim 1, said at least one mounting pin having a length and a cross-sectional diameter along said entire length that is sized to be able to be received within said at least one opening of said at least one mounting block.

14. A roof mirror assembly, comprising:
first and second mirror panels comprising first and second reflective surfaces and first and second mounting surfaces, respectively, said first and second mirror panels being joined together so that said first and second reflective surfaces are substantially perpendicular to each other;
at least one mounting block comprising at least one opening extending through a portion thereof; and
at least one mounting pin having a length and a cross-sectional diameter along said entire length that is sized to be able to be received within said at least one opening of said at least one mounting block, wherein said at least one mounting pin is attached using adhesive material within said opening to said at least one mounting block and further wherein said at least one mounting pin is attached using adhesive material directly to at least one of said first or second mounting surfaces of said first or second mirror panels.

15. A roof mirror assembly as recited in claim 14, further comprising a back plate member attached below said at least one mounting block.

16. A roof mirror assembly as recited in claim 14, said at least one mounting block being first and second mounting blocks and said at least one mounting pin being at least first and second mounting pins.

17. A roof mirror assembly as recited in claim 14, said first and second mounting surfaces being end surfaces of said first and second mirror panels, respectively.

18. A roof mirror assembly as recited in claim 14, each of said mirror panels further comprising at least one protruding element extending from a back portion thereof in a direction generally away from said reflective surface of said mirror panel, said at least one protruding element forming at least one receiving surface extending along portions thereof.

19. A roof mirror assembly as recited in claim 18, said at least one receiving surface of said first mirror panel being said first mounting surface and said at least one receiving surface of said second mirror panel being said second mounting surface.

20. A roof mirror assembly as recited in claim 14, said first mirror panel further having a first edge surface lying in a plane substantially oriented at a 45° angle to a plane of said first reflective surface and said second mirror panel further having a second edge surface lying in a plane substantially oriented at a 45° angle to a plane of said second reflective surface, wherein said first and second edge surfaces are joined together creating a common plane substantially oriented at a 45° angle to both of said planes of said reflective surfaces, and further wherein said joining together of said panels along said common plane causes said first and second reflective surfaces of said mirror panels to be oriented substantially perpendicular to each other.

21. A roof mirror assembly as recited in claim 20 wherein said first and second edge surfaces are joined together creating a miter joint.

22. A roof mirror assembly as recited in claim 14, wherein said first and second mirror panels and said at least one mounting block are formed of the same material.

23. A roof mirror assembly as recited in claim 22, said material having dimensional stability with respect to changes in temperature.

24. A roof mirror assembly as recited in claim 23, wherein said material is one of fused quartz or annealed Pyrex.

25. A roof mirror assembly, comprising:

first and second mirror panels comprising first and second reflective surfaces and first and second mounting surfaces, respectively, said first and second mirror panels being joined together so that said first and second reflective surfaces are substantially perpendicular to each other;

at least one mounting block comprising at least one opening extending through a portion thereof, wherein said first and second mirror panels and said at least one mounting block are formed of the same material; and at least one mounting pin having a length and a cross-sectional diameter along said entire length that is sized to be able to be received within said at least one opening of said at least one mounting block, wherein said at least one mounting pin is attached within said opening to said at least one mounting block and further wherein said at least one mounting pin is attached directly to at least one of said first or second mounting surfaces of said first or second mirror panels.

26. A roof mirror assembly as recited in claim 25, said at least one mounting pin is attached using adhesive material.

27. A roof mirror assembly as recited in claim 25, further comprising a back plate member attached below said at least one mounting block.

28. A roof mirror assembly as recited in claim 25, said at least one mounting block being first and second mounting blocks and said at least one mounting pin being at least first and second mounting pins.

29. A roof mirror assembly as recited in claim 25, said first and second mounting surfaces being end surfaces of said first and second mirror panels, respectively.

30. A roof mirror assembly as recited in claim 25, each of said mirror panels further comprising at least one protruding element extending from a back portion thereof in a direction generally away from said reflective surface of said mirror panel, said at least one protruding element forming at least one receiving surface extending along portions thereof.

31. A roof mirror assembly as recited in claim 30, said at least one receiving surface of said first mirror panel being said first mounting surface and said at least one receiving surface of said second mirror panel being said second mounting surface.

32. A roof mirror assembly as recited in claim 25, said material having dimensional stability with respect to changes in temperature.

33. A roof mirror assembly as recited in claim 25, wherein said material is one of fused quartz or annealed Pyrex.

* * * * *